United States Patent
Kasuya et al.

(10) Patent No.: US 9,022,702 B2
(45) Date of Patent: May 5, 2015

(54) DUST COLLECTING ATTACHMENT

(75) Inventors: Yoshihiro Kasuya, Anjo (JP); Hajime Takeuchi, Anjo (JP); Masanori Furusawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 1314 days.

(21) Appl. No.: 12/829,920

(22) Filed: Jul. 2, 2010

(65) Prior Publication Data
US 2011/0008117 A1   Jan. 13, 2011

(30) Foreign Application Priority Data
Jul. 10, 2009   (JP) ................. 2009-163983

(51) Int. Cl.
| | | |
|---|---|---|
| *B23B 47/34* | (2006.01) | |
| *B23Q 11/00* | (2006.01) | |
| *B25D 16/00* | (2006.01) | |
| *B25D 17/08* | (2006.01) | |

(52) U.S. Cl.
CPC .......... *B23Q 11/0046* (2013.01); *Y10T 408/50* (2015.01); *B23B 2270/30* (2013.01); *B23Q 11/0071* (2013.01); *B23B 2260/058* (2013.01); *B23B 47/34* (2013.01); *B25D 16/00* (2013.01); *B25D 17/088* (2013.01); *B25D 2216/0015* (2013.01); *B25D 2216/0023* (2013.01); *B25D 2216/0038* (2013.01)

(58) Field of Classification Search
CPC ..................... B23B 2270/30; B23B 2260/058; B23B 47/34; B23Q 11/0046; B23Q 11/0071
USPC ...................... 175/209; 408/67, 56
See application file for complete search history.

(56) References Cited

U.S. PATENT DOCUMENTS

| | | | | |
|---|---|---|---|---|
| 3,339,435 | A * | 9/1967 | Walter-Helmut | 408/67 |
| 4,955,984 | A * | 9/1990 | Cuevas | 408/67 |
| 5,775,440 | A * | 7/1998 | Shinma | 173/109 |
| 7,740,086 | B2 * | 6/2010 | Bleicher et al. | 173/198 |

(Continued)

FOREIGN PATENT DOCUMENTS

| | | | |
|---|---|---|---|
| DE | 2453791 | A  *  | 5/1976 |
| DE | 93 06 373 | U1 | 6/1993 |

(Continued)

OTHER PUBLICATIONS

Machine Translation of JP-2009226518 A.*

(Continued)

*Primary Examiner* — Daniel Howell
*Assistant Examiner* — Chwen-Wei Su
(74) *Attorney, Agent, or Firm* — Oliff PLC

(57) ABSTRACT

It is an object of the invention to provide a technique that contributes to rationalization of dust collection, in a dust collecting attachment for use on a power tool.
Dust collecting attachments 250, 350 are used on a power tool 201 having a tool body 203, a tool bit 209 which can be coupled to a front end region of the tool body 203, and an auxiliary handle 208 attached to the tool body 203. The dust collecting attachments 250, 350 include dust collecting members 251, 351, respectively, which can be attached to the auxiliary handle 208 in such a manner as to surround the front end region of the tool body 203 around a longitudinal axis of the front end region in order to collect dust generated during operation by the power tool 201, and a connecting hose 273 for connecting the dust collecting members 251, 351 to a dust collector.

11 Claims, 9 Drawing Sheets

(56) References Cited

U.S. PATENT DOCUMENTS

| | | | |
|---|---|---|---|
| 7,901,164 B2 * | 3/2011 | Skradski et al. | 408/67 |
| 2001/0052429 A1 | 12/2001 | Frenzel et al. | |
| 2007/0264091 A1 | 11/2007 | Bleicher et al. | |

FOREIGN PATENT DOCUMENTS

| | | | |
|---|---|---|---|
| DE | 10 2007 019 704 A1 | | 11/2008 |
| EP | 1 714 735 A1 | | 10/2006 |
| EP | 1 842 612 A1 | | 10/2007 |
| EP | 1857221 A2 | | 11/2007 |
| EP | 2 199 013 A1 | | 6/2010 |
| GB | 1 334 366 | | 10/1973 |
| GB | 2130715 A | | 6/1984 |
| JP | U-52-036702 | | 3/1977 |
| JP | 63016910 A | * | 1/1988 |
| JP | A-11-58111 | | 3/1999 |
| JP | A-2001-353715 | | 12/2001 |
| JP | A-2005-246530 | | 9/2005 |
| JP | B2-3726437 | | 12/2005 |
| JP | 2007276064 A | * | 10/2007 |
| JP | A-2008-272908 | | 11/2008 |
| JP | 2009226518 A | * | 10/2009 |
| NL | 7610371 A | * | 3/1977 |

OTHER PUBLICATIONS

Machine Translation of NL-7610371 A.*
May 31, 2013 Japanese Office Action issued in Japanese Patent Application No. 2009-163983.
Partial European Search Report issued in European Application No. 10168973.5 dated Nov. 24, 2010.
Extended European Search Report issued in European Application No. 10168973.5 dated Mar. 15, 2011.
Dec. 15, 2011 Office Action issued in European Patent Application No. 10 168 973.5.
Jun. 2, 2014 Search Report issued in European Patent Application No. 13193155.2.

* cited by examiner

FIG. 4
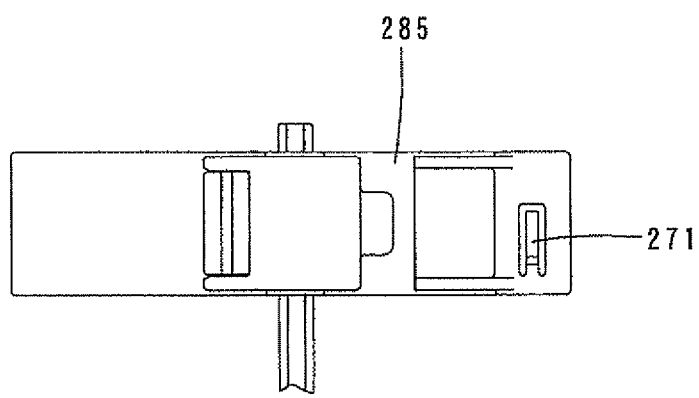
FIG. 5
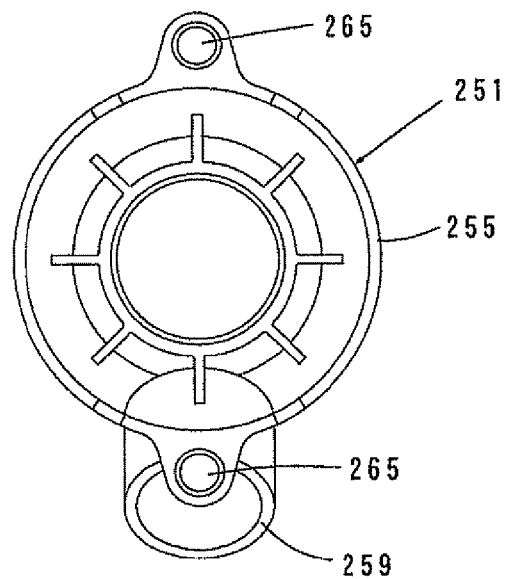
FIF. 6
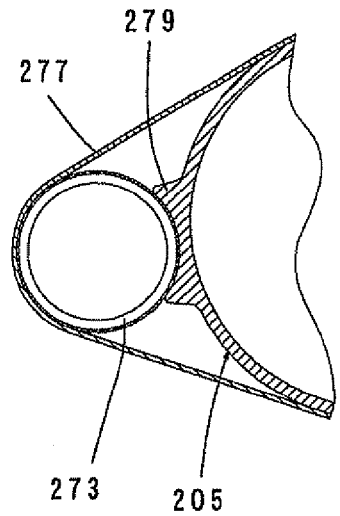

DUST COLLECTING ATTACHMENT

BACKGROUND OF THE INVENTION

1. Field of the Invention

The invention relates to a dust collecting attachment for collecting dust generated during operation, which is used on a power tool that performs a predetermined operation on a workpiece by driving a tool bit.

2. Description of the Related Art

Japanese patent publication No. 3726437 discloses a dust collecting attachment. This known dust collecting attachment is used on a hammer drill in which a hammer bit linearly moves in the axial direction and rotates in the circumferential direction. The dust collecting attachment includes a dust collecting cup for collecting dust generated during drilling operation on a workpiece. The dust collecting cup is shaped like a bellows and arranged to surround a front end region of the tool body around the longitudinal axis of the front end region, and one end of the dust collecting cup in the longitudinal direction is mounted to a side handle of the hammer drill.

According to the above-described known dust collecting cup, dust generated during operation can be collected, but further rationalization of dust collection is desired.

SUMMARY OF THE INVENTION

Accordingly, it is an object of the invention to further rationalize the dust collection of a dust collecting attachment used in a power tool.

Above described object can be achieved by the claimed invention. According to the invention, a representative dust collecting attachment is provided which is used on a power tool having a tool body, a tool bit which can be coupled to a front end region of the tool body, and an auxiliary handle attached to the tool body. The dust collecting attachment includes a dust collecting member which can be attached to the auxiliary handle in such a manner as to surround the front end region of the tool body around a longitudinal axis of the front end region in order to collect dust generated during operation by the power tool, and a connecting hose for connecting the dust collecting member to a dust collector. The "power tool" in the invention typically represents a hammer in which a tool bit performs a hammering operation on a workpiece by linearly moving in the axial direction, or a hammer drill in which a tool bit performs a hammer drill operation on a workpiece by linearly moving in the axial direction and rotating around its axis.

The auxiliary handle attached to the tool body is a non-rotational member. The dust collecting attachment according to this invention can be attached to such a non-rotational auxiliary handle. Therefore, the dust collecting attachment can be used on both the power tool in which the tool bit is caused to perform striking movement in the axial direction and the power tool in which the tool bit is caused to perform striking movement in the axial direction and rotation around its axis. Further, the auxiliary handle is a member retrofitted to the tool body. Therefore, with the construction in which the dust collecting attachment is attached to the auxiliary handle, the dust collecting attachment can be applied without making any change or modification to the tool body of the power tool.

Particularly, according to the invention, the dust collecting attachment has a connecting hose for connecting the dust collecting member to a dust collector. Therefore, dust generated during operation is collected by the dust collecting member and dust within the dust collecting member can be forcibly sucked by the dust collector. With such a construction, an additional process of disposal of dust accumulated in the dust collecting member, which is required in the construction in which dust is not forcibly collected, can be dispensed with, so that rational dust collection can be realized. Further, it is not necessary to interrupt the operation in order to dispose of the dust collected within the dust collecting member, so that workability can also be improved.

According to a further aspect of the invention, the dust collecting member may preferably have a protrusion on one end of the dust collecting member in the longitudinal direction, and is attached to the auxiliary handle by insertion of the protrusion into a mounting hole formed in the auxiliary handle. With such a construction, the dust collecting member can be easily attached to the auxiliary handle.

According to a further aspect of the invention, the protrusion inserted into the mounting hole may be engaged with a resin spring formed on a wall surface of the mounting hole and thereby retained in an inserted position. The "engagement" is preferably provided by the construction in which the protrusion and the resin spring have a concave and a convex, respectively, which are designed to be engaged with each other when the protrusion is inserted to a predetermined position in the mounting hole. According to the invention, the protrusion inserted into the mounting hole can be retained by the resin spring, so that the dust collecting member can be prevented from unexpectedly becoming detached from the auxiliary handle, for example, due to vibration caused by operation. Further, the resin spring can be integrally formed with a component of the mounting hole, so that manufacturability can be improved.

According to a further aspect of the invention, two mounting holes and two protrusions may be provided in the circumferential direction of the dust collecting member, and each of the protrusions may preferably be shaped like a cylindrical pin. With such a construction, the protrusions can be easily inserted into the mounting holes and the dust collecting member can be attached to the auxiliary handle with stability.

According to a further aspect of the invention, a dust collecting attachment may be provided which is used on a power tool that performs a predetermined operation on a workpiece by a tool bit coupled to a front end region of a tool body. The dust collecting attachment may have a dust collecting member for use in a first operation mode in which the tool bit only linearly moves, and this dust collecting member may include a bit surrounding portion that surrounds the tool bit around a longitudinal axis of the front end region of the tool body, and a front end region surrounding portion that surrounds the front end region of the tool body around the longitudinal axis of the front end region. The dust collecting attachment further has a dust collecting member for use in a second operation mode in which the tool bit at least rotates, and this dust collecting member includes a bit surrounding portion that surrounds the tool bit around the longitudinal axis of the front end region of the tool body, and a front end region surrounding portion that surrounds the front end region of the tool body around the longitudinal axis of the front end region. Each of the dust collecting members for use in the first and second operation modes can be disposed in such a manner as to surround the front end region of the power tool around the longitudinal axis in order to collect dust generated by operation of the power tool, and at least the bit surrounding portions of the dust collecting members can be replaced with each other.

According to the invention, the dust collecting member for use in operation in the first operation mode (hammering operation) in which the tool bit only linearly moves, or the dust collecting member for use in operation in the second operation mode (drilling operation) in which the tool bit at least rotates can be attached to the front end region of the tool body by replacing the bit surrounding portions with each other or by replacing not only the bit surrounding portions but also the dust collecting members in their entirety including the front end region surrounding portions with each other. Therefore, during operation, dust can be collected by using the dust collecting members each designed to efficiently collect dust in assigned operation mode. For example, in hammering operation in the first operation mode, the dust collecting member having the bit surrounding portion which is conically shaped (trumpet-shaped) such that dust (concrete pieces) easily enter the dust collecting member can be used. Further, in drilling operation in the second operation mode, the dust collecting member having the bit surrounding portion which has an extensible structure such that an operation can be performed with the dust collecting member pressed against a workpiece can be used. Thus, according to the invention, rational dust collection can be realized by using the dust collecting members suitable for each operation mode. Particularly, in the construction in which the bit surrounding portions are replaced with each other, the front end region surrounding portions can be rationally shared.

According to a further aspect of the invention, the dust collecting member for use in the first operation mode may be configured such that an opening area of its front end region in the longitudinal direction is larger than a sectional area of the bit surrounding portion. Further, the first dust collecting member has a region for filling a clearance between an outer circumferential surface of the tool bit and an inner circumferential surface of the dust collecting member in a halfway region in the longitudinal direction. By thus increasing the opening area of the front end region, the dust collecting member can efficiently receive dust. Further, with the construction in which the dust collecting member has the region for filling the clearance between the outer circumferential surface of the tool bit and the inner circumferential surface of the dust collecting member in the halfway region in the longitudinal direction, large concrete pieces can be prevented from being sucked to the downstream side and thereby causing clogging of the hose.

According to a further aspect of the invention, the dust collecting member may have an opening which is located in a position corresponding to an operating member which is provided for removal of the tool bit and/or for bit angle adjustment in the front end region of the power tool, and the operating member can be operated by user's fingers through the opening. With such a construction, the user can operate the operating member through the opening with the dust collecting member left attached to the power tool, so that workability in removal of the tool bit and/or bit angle adjustment can be improved.

Further, the "operating member" in the invention typically represents a member which is operated to release the tool bit from the tool holding device in order to remove the tool bit held by the tool holding device, and/or, a member for adjusting the angle of the tool bit held by the tool holding device to a predetermined angle when the power tool performs in hammer mode in which the tool bit is caused to linearly move in its axial direction.

According to a further aspect of the invention, the dust collecting member may have a fastener for fastening the connecting hose to the tool body of the power tool. Thus, the connecting hose can be fastened to the tool body along its outer surface. As a result, the connecting hose is prevented from hanging down and swinging during operation and thus prevented from interfering with the operation.

According to a further aspect of the invention, the fastener may comprise a band-like member for binding the connecting hose to the tool body. With such a construction, the connecting hose can be easily fastened to the tool body. Further, the manner of "binding" typically represents tying or strapping, but widely includes other manners such as fastening by a hook-and-loop fastener.

According to a further aspect of the invention, the connecting hose may be held by a supplementary fixing rib which is formed on the tool body and conforms to an outer circumferential surface of the connecting hose. With such a construction, the connecting hose can be held fastened to the tool body with higher stability.

According to a further aspect of the invention, a power tool may be provided which has the dust collecting attachment as defined in any one of claims 1 to 10. Thus, the power tool can be provided with the dust collecting attachment having an improved dust collecting effect.

Other objects, features and advantages of the present invention will be readily understood after reading the following detailed description together with the accompanying drawings and the claims.

BRIEF DESCRIPTION OF THE DRAWINGS

FIG. 4 is a view as viewed from the direction shown by the arrow A in FIG. 3.

FIG. 5 is a view showing the dust collecting attachment as viewed from the rear of the hammer drill (from the right side as viewed in FIG. 1).

FIG. 6 is a sectional view taken along line B-B in FIG. 1.

DETAILED DESCRIPTION OF THE INVENTION

Each of the additional features and method steps disclosed above and below may be utilized separately or in conjunction with other features and method steps to provide and manufacture improved dust collecting attachments and method for using such dust collecting attachments and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment

Figure 1:
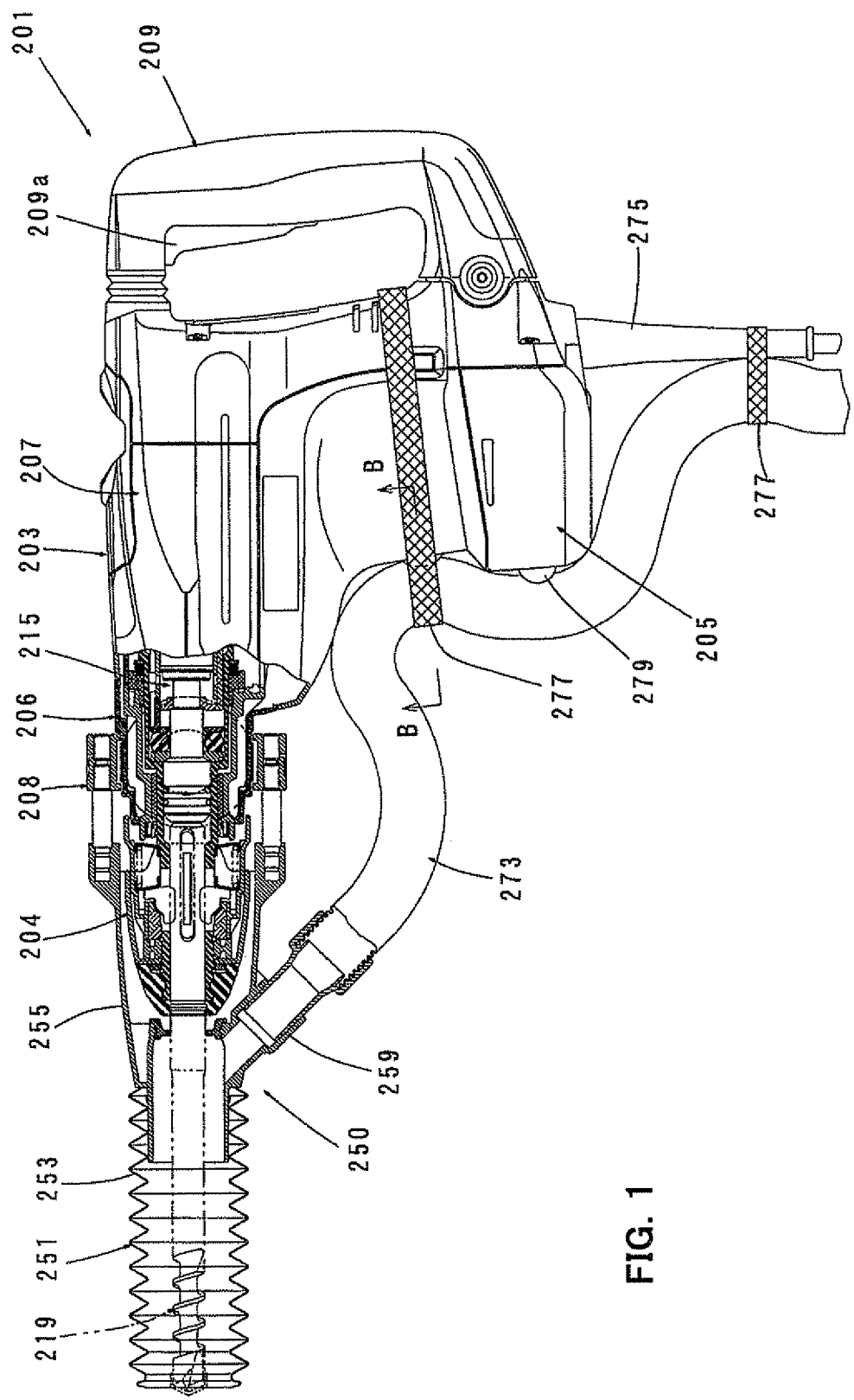
FIG. 1 is a partially sectional view showing an entire structure of a hammer drill with a dust collecting attachment for use in hammer drill operation according to a first embodiment of the invention.
Figure 2:
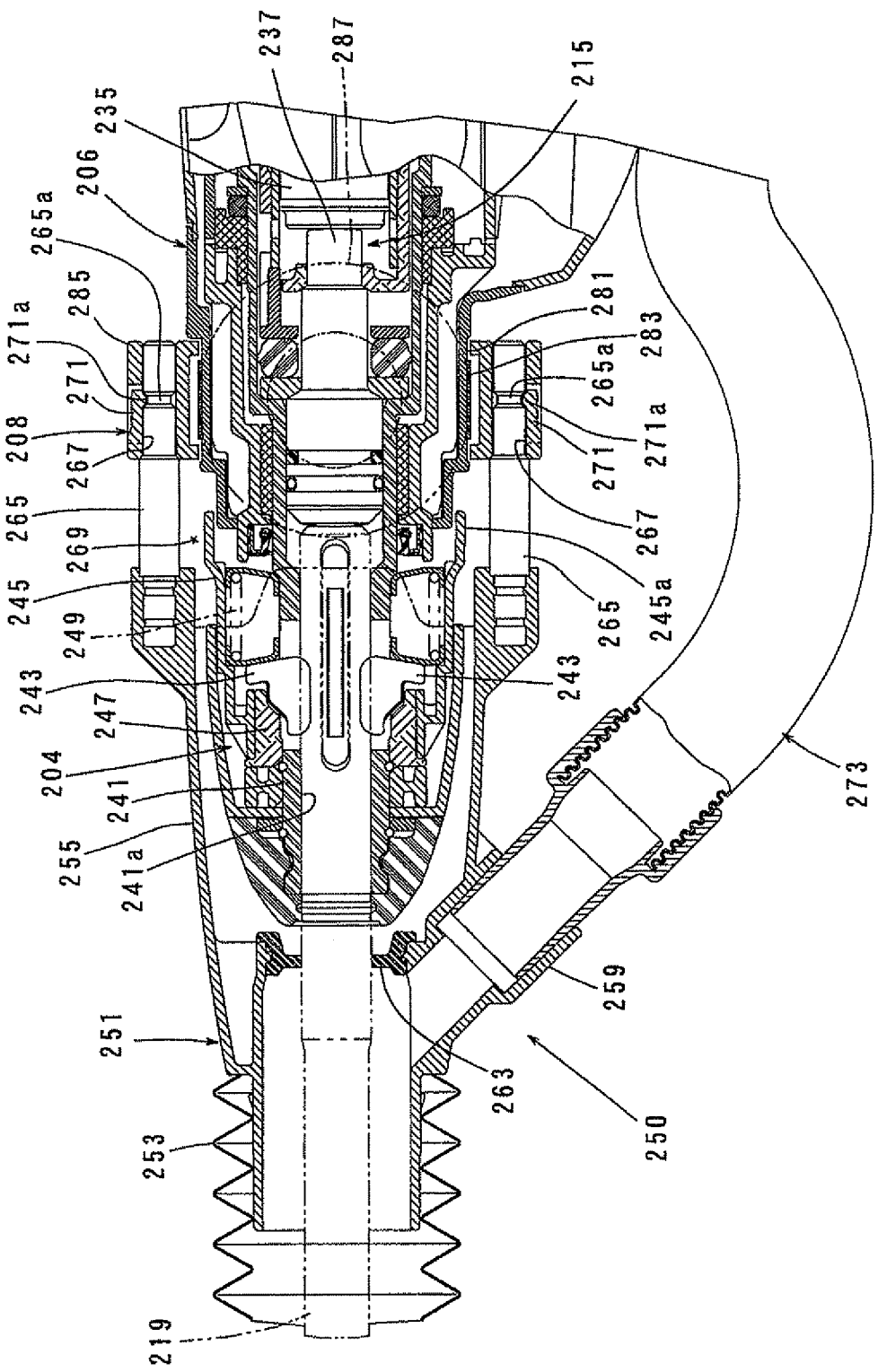
FIG. 2 is an enlarged view showing part (the dust collecting attachment side) of FIG. 1.

A first embodiment of the invention is now described with reference to FIGS. 1 to 6. In this embodiment, a dust collecting attachment is used on an electric hammer drill which is a representative example of a power tool. Firstly, a hammer drill on which the dust collecting attachment is used is explained. As shown in FIGS. 1 and 2, a hammer drill 201 mainly includes a body 203 that forms an outer shell of the hammer drill 201, a hammer bit 219 detachably coupled to a tip end region (front end portion) of the body 203 via a tool holding device 204 and a handgrip 209 that is designed as a main handle and disposed on a side (rear end portion) of the body 203 opposite from the hammer bit 219. The hammer bit 219 is held by the tool holding device 204 such that it is allowed to move with respect to the tool holding device 204 in its axial direction and prevented from rotating with respect to the tool holding device in its circumferential direction. The body 203 and the hammer bit 219 are features that correspond to the "tool body" and the "tool bit", respectively, according to the invention. For the sake of convenience of explanation, the side of the hammer bit 219 is taken as the front and the side of the handgrip 209 as the rear.

The body 203 mainly includes a motor housing 205 that houses a driving motor (not shown), and a gear housing 207 that houses an internal mechanism related to striking movement and rotation of the hammer bit 219. In this embodiment, the driving motor is disposed such that its rotation axis extends in a direction transverse to the axial direction of the hammer bit 219. Therefore, as shown in FIG. 1, the body 203 has a generally L-shaped body structure formed by the motor housing 205 and the gear housing 207. Further, the handgrip 209 disposed on the rear end of the body 203 is configured as a generally D-shaped handle extending in the vertical direction transverse to the axial direction of the hammer bit 219 and having upper and lower ends connected to the body 203. A cylindrical barrel 206 is provided on the front of the gear housing 207 and the side grip 208 is detachably attached to the barrel 206. The side grip 208 is a feature that corresponds to the "auxiliary handle" according to the invention. Attachment of the side grip 208 is described below.

Further, the internal mechanism mainly includes a crank mechanism (not shown) as a motion converting mechanism, a striking mechanism 215 and a power transmitting mechanism (not shown). The crank mechanism converts the rotating output of the driving motor into linear motion. The striking mechanism 215 linearly moves in the longitudinal direction of the body 203 via components of linear motion of the crank mechanism and thereby strikes the hammer bit 219. The power transmitting mechanism appropriately reduces the speed of the rotating output of the driving motor and transmits it to the hammer bit 219 and thereby causes the hammer bit 219 to rotate in the circumferential direction. The striking mechanism 215 mainly includes a striking element in the form of a striker 235 that linearly moves, and an intermediate element in the form of an impact bolt 237 that transmits the striking force of the striker 235 to the hammer bit 219 (see FIG. 2). Further, a specific structure of causing the hammer bit 219 to perform the striking movement and rotation via the internal mechanism is known and therefore it is not described in further detail.

As shown in FIG. 2, the tool holding device 204 mainly includes a cylindrical tool holder 241 with a bit insert hole 241a having a circular section into which the stem of the hammer bit 219 is removably inserted, a removal preventing member in the form of a plurality of engagement claws 243 which prevent removal of the hammer bit 219 inserted into the bit insert hole 241a, and a generally cylindrical tool sleeve 245 that can be operated to release the hammer bit 219 from removal prevention by the engagement claws 243. The tool sleeve 245 is disposed in front of the barrel 206 of the gear housing 207 such that it can be moved by the user in the axial direction of the hammer bit 219. The tool sleeve 245 is normally biased forward by a biasing spring 249 and retains the engagement claws 243 in the removal preventing position (as shown in the drawing) via a retaining ring 247. When the tool sleeve 245 is slid rearward (toward the handgrip), the bit removal prevention by the engagement claws 243 is released. The tool sleeve 245 is a feature that corresponds to the "operation member for removal of the tool bit" according to the invention.

In the hammer drill 201 constructed as described above, when the driving motor is driven by depressing a trigger 209a, the rotating output of the driving motor is converted into linear motion via the motion converting mechanism and then transmitted as linear motion in the axial direction to the hammer bit 219 via the striking mechanism. As a result, the hammer bit 219 performs linear movement (hereinafter also referred to as striking movement). Further, rotation is transmitted to the tool holding device 204 via the power transmitting mechanism driven by the rotating output of the driving motor, so that the hammer bit 219 held by the tool holding device 204 is caused to rotate in the circumferential direction. Specifically, the hammer bit 219 performs a hammer drill (drilling) operation on a workpiece (concrete) by striking movement in the axial direction and rotation in the circumferential direction.

The hammer drill 201 can be switched not only to the hammer drill mode in which the hammer bit 119 is caused to perform striking movement in the axial direction and rotation in the circumferential direction as described above, but to the drill mode in which the hammer bit 119 is caused to perform only rotation, or the hammer mode in which the hammer bit 119 is caused to perform only striking movement. This mode switching is a known technique and not directly related to the invention, and therefore its description is omitted.

Figure 3:
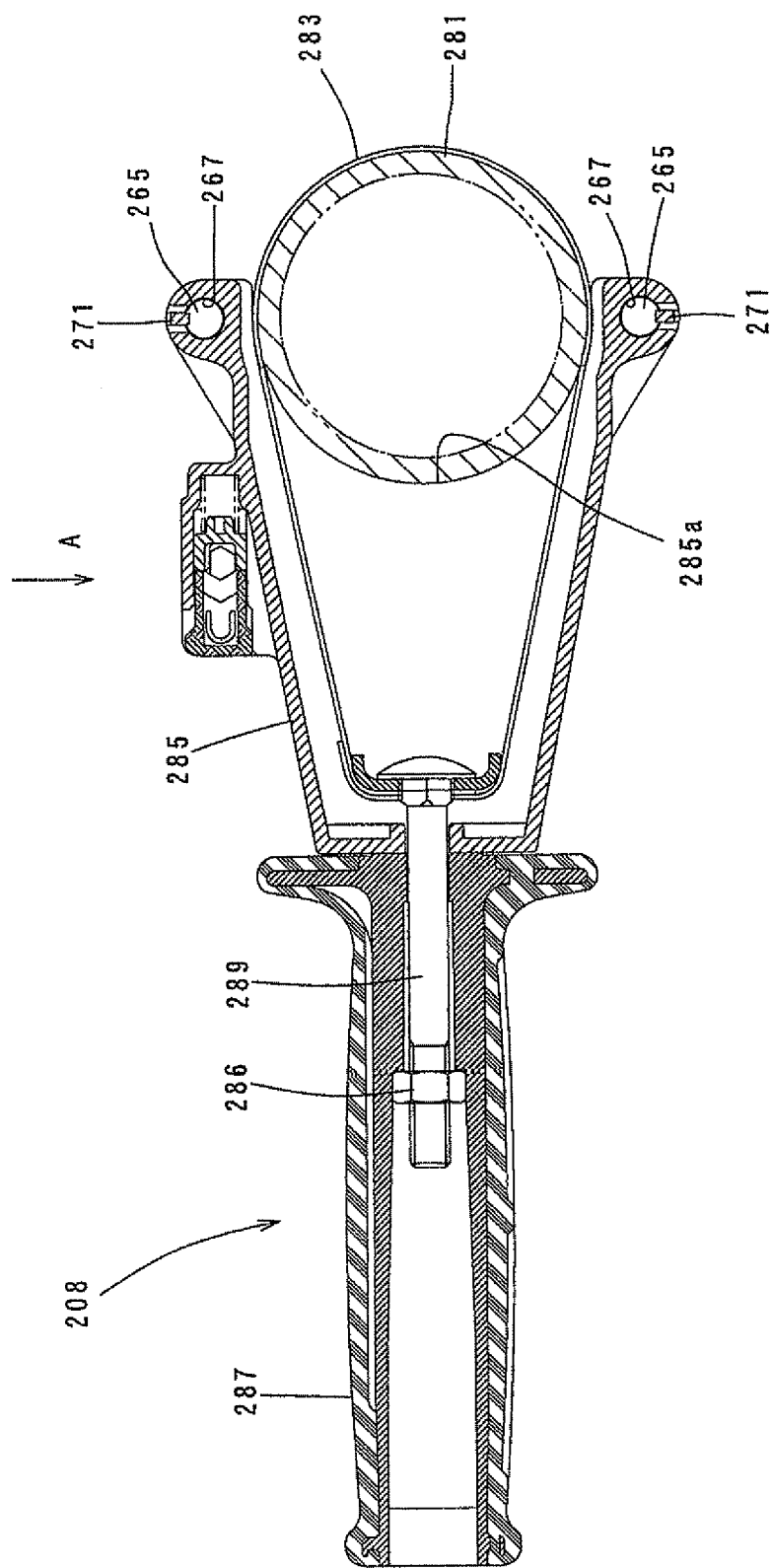
FIG. 3 is a sectional view showing a side grip to which the dust collecting attachment is attached.

The hammer drill 201 constructed as described above generates dust during operation on a workpiece (such as concrete). In order to collect the dust, the dust collecting attachment 250 according to this embodiment is mounted to the side grip 208. Therefore, the side grip 208 is described before explanation of the dust collecting attachment 250. The side grip 208 is mounted to the barrel 206 of the gear housing 207. To this end, a grip mounting portion 281 is formed on the outer surface of the barrel 206 by a circumferential surface having a predetermined width and extending parallel to the longitudinal direction of the body 203. As shown in FIG. 3, the side grip 208 is configured as a rod-like member extending in a direction transverse to the axial direction of the hammer bit 219 as a whole.

As shown in FIG. 3, the side grip 208 mainly includes a band 283 wrapped around the outer surface of the grip mounting portion 281 of the barrel 206, a base 285 having a generally U-shaped engagement surface 285a which is disposed on the end of the band 283 and engaged with the outer surface of the grip mounting portion 281, a grip 287 which is connected to the base 285 and can rotate around its longitudinal axis, and a threaded operation rod 289 for tightening the band 283. The operation rod 289 is loosely inserted through the central portions of the grip 287 and the base 285 and extends in the longitudinal direction of the grip. One end of the operation rod 289 is connected to the end of the band 283 and the other end is threadably engaged with a nut 286 disposed within the grip 287. The nut 286 is prevented from rotating with respect to the grip 287. Therefore, by rotating the grip 287 clockwise or counterclockwise around its longitudinal axis, the threaded operation rod 289 threadably engaged with the nut 286 is moved forward or rearward in the longitudinal direction, so that the band 283 can be tightened or loosened. The side grip 208 is fixed to the grip mounting portion 281 by tightening the band 283. In this embodiment, the side grip 208 is mounted to the body 203 and protrudes substantially horizontally in a lateral direction of the body 203.

The dust collecting attachment 250 is now explained. The dust collecting attachment 250 according to this embodiment is designed for drilling operation in which the hammer bit 219 is driven in hammer drill mode or drill mode. As shown in FIG. 2, the dust collecting attachment 250 mainly includes a dust collecting cup 251 which has a cylindrical shape having both ends open and covers the front end region of the body 203 including the hammer bit 219, and a connecting hose 273 which connects the dust collecting cup 251 to a dust collector. The dust collecting cup 251 is a feature that corresponds to the "dust collecting member" according to the invention. The dust collecting cup 251 includes an extensible bellows cup body 253, and a cylindrical cup mounting portion 255 which is connected to one end (rear end) of the cup body 253 in the longitudinal direction (in the direction of expansion and contraction). When the dust collecting cup 251 is attached to the side grip 208, the cup body 253 surrounds and covers the hammer bit 219, and the cup mounting portion 255 surrounds and covers the front end portion of the body 203 or the tool holding device 204 which holds the hammer bit 219. The cup body 253 and the cup mounting portion 255 are features that correspond to the "bit surrounding portion" and the "front end region surrounding portion", respectively, according to the invention. Further, a dust discharge nozzle 259 and a sealing member 263 are provided on the cup mounting portion 255 in its region of connection with the cup body 253. The dust discharge nozzle 259 is open to the internal space of the cup mounting portion 255, and the sealing member 263 serves to fill a clearance between the cup mounting portion 255 and the stem of the hammer bit 219. The dust discharge nozzle 259 is a feature that corresponds to the "hose connecting port" according to the invention. Further, as shown in FIG. 1, the dust collecting cup 251 of the dust collecting attachment 250 for use in drilling operation has such a longitudinal length that it almost entirely covers the hammer bit (which is also referred to as drill) 219 for drilling operation.

As shown in FIG. 5, two poles 265 having a circular section are provided on the rear end of the cup mounting portion 255 (on the body 203 side) in order to mount the cup mounting portion 255 to the side grip 208. The poles 265 extend rearward in parallel to each other and are spaced 180 degrees apart from each other in the circumferential direction. Correspondingly, as shown in FIG. 3, two engagement holes 267 which face the cup mounting portion 255 are formed in the base 285 of the side grip 208. As shown in FIG. 2, an end (rear end) of each of the poles 265 is inserted into the associated engagement hole 267, so that the cup mounting portion 255 is mounted to the base 285 of the side grip 208 in such a manner as to face the base 285 with a predetermined spacing in the axial direction of the hammer bit 219. The pole 265 and the engagement hole 267 are features that correspond to the "protrusion" and the "mounting hole", respectively, according to the invention.

In this embodiment, by provision of the two poles 265 protruding rearward from the cup mounting portion 255, two generally U-shaped spaces surrounded by the rear surface of the cup mounting portion 255 and the two poles 265 and having an open rear end are defined at the rear of the cup mounting portion 255. As shown in FIG. 2, when the cup mounting portion 255 is mounted to the side grip 208 with a predetermined spacing in the axial direction of the hammer bit 219 via the poles 265, two access spaces 269 are defined by the rear surface of the cup mounting portion 255, the front surface of the base 285 and the two poles 265 between the base 285 of the side grip 208 and the cup mounting portion 255. Thus, the user can operate the rear end of the tool sleeve 245 of the tool holding device 204, or a knob 245a, by the fingers through the access spaces 269. The access space 269 is a feature that corresponds to the "opening" according to the invention. Further, the length of the access space 269 in the longitudinal direction can be appropriately set by changing the length of the poles 265.

As shown in FIGS. 2 to 4, an engagement member 271 is provided on the base 285 of the side grip 208 and has a generally semicircular engagement protrusion 271a which protrudes radially inward into the engagement hole 267. When the pole 265 of the dust collecting cup 251 is inserted into the associated engagement hole 267, the engagement member 271 is elastically engaged with an annular engagement groove 265a formed in the outer circumferential surface of the pole 265 and thereby retains the pole 265 in the inserted position. Thus, the engagement member 271 is provided as a pole retaining member. When the pole 265 is pulled forward, the engagement member 271 is elastically deformed radially outward, so that the engagement protrusion 271a is disengaged from the engagement groove 265a. Thus, the pole 265 can be removed from the engagement hole 267. The engagement member 271 is a feature that corresponds to the "resin spring" according to the invention.

A connecting hose 273 for connecting the dust discharge nozzle 259 to a dust collector can be connected to the dust discharge nozzle 259. As shown in FIG. 1, the connecting hose 273 connected to the dust discharge nozzle 259 extends from the dust discharge nozzle 259 to the body 203 or to the front of the motor housing 205 and extends downward along the front surface of the motor housing 205. The connecting hose 273 is bound to the motor housing 205 and to a cord guard 275 which extends downward from the motor housing 205 and serves to protect a power cord, with banding bands 277, such that the connecting hose 273 is prevented from hanging down and swinging during operation. The banding band is a feature that corresponds to the "fastener" and "band-like member" according to the invention.

Further, a hose holding rib 279 is formed on the front surface of the motor housing 205 and has a concave portion which conforms to an outer circumferential surface of the connecting hose 273. As shown in FIG. 6, the outer surface of the connecting hose 273 is engaged with the concave portion of the hose holding rib 279, so that the movement of the connecting hose 273 bound with the banding bands 277 is further prevented. Thus, the stability of the connecting hose 273 is further improved. The hose holding rib 279 is a feature that corresponds to the "hose holding portion" according to the invention.

The dust collecting attachment 250 according to this embodiment is constructed as described above. Drilling operation on a workpiece (concrete) by the hammer drill 201 is performed with the front end of the dust collecting cup 251 pressed against the workpiece. The dust collecting cup 251 according to this embodiment has an extensible bellows cup body 253 on its front end, so that the cup body 253 contracts as the body 203 moves toward the workpiece by drilling movement of the hammer bit 219. As a result, dust collection suitable for drilling operation can be realized. Then dust generated by drilling operation is collected by the dust collecting cup 251 and forcibly sucked from the dust discharge nozzle 259 via the connecting hose 273 by a dust collector.

As described above, according to this embodiment, dust generated during drilling operation can be collected in the dust collecting cup 251, and at the same time, the dust collected in the dust collecting cup 251 can be forcibly sucked by the dust collector. Therefore, an additional process of disposal of dust accumulated within the dust collecting cup 251, which is required in the construction in which dust is simply collected in the dust collecting cup, can be dispensed with, so that rational dust collection can be realized. Further, it is not necessary to interrupt the operation in order to dispose of the dust collected within the dust collecting cup 251, so that workability can also be improved.

Further, in this embodiment, the dust collecting attachment 250 is attached to the side grip 208 of the type which is retrofitted to the body 203 of the hammer drill 201. Therefore, the dust collecting attachment 250 can be applied without making any change or modification to the body 203 of the hammer drill 201. Further, the side grip 208 is configured as a non-rotational member, so that the side grip 208 can be suitably used for drilling operation in which the hammer drill 201 is driven in hammer drill mode or in drill mode.

Further, the dust collecting attachment 250 is attached to the side grip 208 via the two poles 265. At this time, in this embodiment, the protruding direction of the dust discharge nozzle 259 of the dust collecting cup 251 has a phase difference of about 90 degrees in the circumferential direction with respect to the protruding direction of the side grip 208 attached to the body 203. With this construction, even though the dust collecting cup 251 is attached to the side grip 208, the connecting hose 273 connected to the dust discharge nozzle 259 can be prevented from interfering with the user's hand holding the side grip 208. Further, the connecting hose 273 is fixed by the banding band 277 so as to extend along the body 203, so that the connecting hose 273 can be prevented from hanging down and swinging. Therefore, when the user holds the side grip 208 and performs an operation, the connecting hose 273 is prevented from interfering with the operation, so that workability can be improved.

Further, in this embodiment, the two access spaces 269 for bit removal are defined by the two poles 265 in the circumferential direction, so that the user can operate a knob 245a of the tool sleeve 245 of the tool holding device 204 by the fingers through the access spaces 269. Therefore, in the state in which the dust collecting attachment 250 is left attached to the body 203, the user can move the tool sleeve 245 of the tool holding device 204 rearward by the fingers through the two access spaces 269. As a result, the hammer bit 219 can be released from removal prevention of the engagement claw 243, so that the hammer bit 219 can be removed from the bit insert hole 241a of the tool holder 241 of the tool holding device 204. Specifically, the hammer bit 219 can be removed with the dust collecting attachment 250 left attached to the body 203.

In the hammer drill 201 which can be switched to the hammer mode in which the hammer bit 219 is caused to perform only a striking movement, a bit angle setting mechanism (a variolock mechanism) is provided which serves to prevent rotation of the hammer bit 219 (to forcibly lock the tool holder 241 of the tool holding device 204 to the gear housing 207) in order to keep the angle of the hammer bit 219 constant (to prevent the hammer bit 219 from moving in the circumferential direction) during operation in hammer mode. The angle setting mechanism of the hammer bit 219 is configured such that the hammer bit 219 is released from the rotation prevention halfway through the operation of switching the operation mode of the hammer bit 219, for example, from hammer drill mode to hammer mode, by an operation mode switching lever, and when the switching operation to hammer mode is completed, the hammer bit 219 is again prevented from rotating. Therefore, the angle setting of the hammer bit 219 can be made by turning the tool sleeve 245 of the tool holding device 204 in the circumferential direction by the user's fingers in the halfway region of the switching movement in which the hammer bit 219 is not prevented from rotating by the bit angle setting mechanism. Specifically, with the dust collecting attachment 250 according to this embodiment, the angle setting of the hammer bit 219 can be made through the bit removal access spaces 269 with the dust collecting attachment 250 left attached to the body 203.

Second Embodiment

A dust collecting attachment 350 according to a second embodiment of the invention is now explained with reference to FIGS. 7 to 9. The dust collecting attachment 350 according to the second embodiment is changed from the construction designed for drilling operation to the construction designed for hammering operation. Therefore, the dust collecting attachment 350 can be applied not only to a hammer in which the hammer bit only linearly moves, but also to a hammer drill that can be switched between hammer mode in which the hammer bit only linearly moves and hammer drill mode in which the hammer bit linearly moves and rotates. Further, as well known, the hammer has the same structure as the hammer drill, except that the hammer does not have the power transmitting mechanism for rotating the hammer bit.

This embodiment is applied to the hammer drill 201 described in the first embodiment for the sake of convenience. Therefore, components of the hammer drill 201 including the tool holding device 204 and components of the side grip 208 attached to the hammer drill 201 are given like numerals as in the first embodiment and not described.

Figure 7:
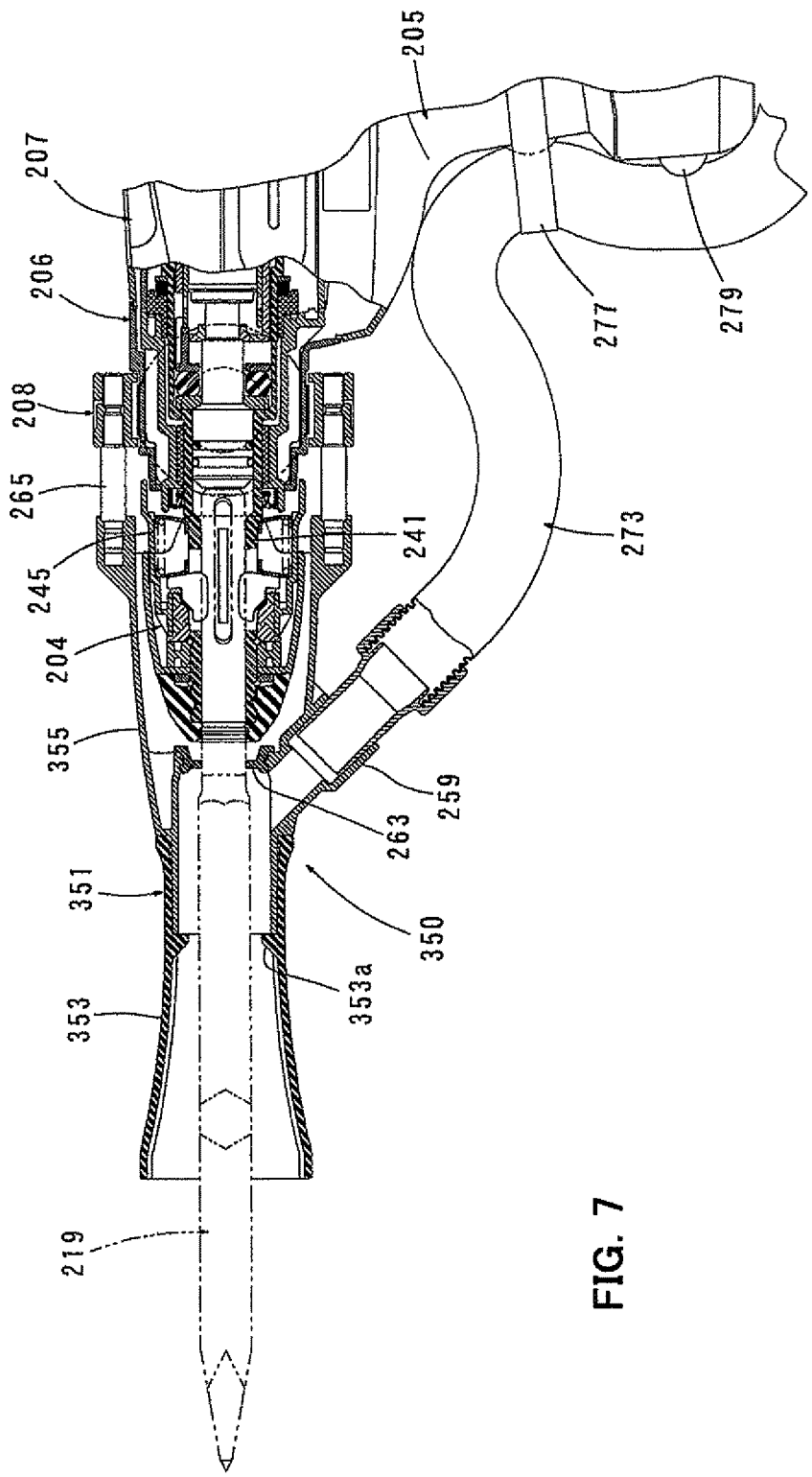
FIG. 7 is a view showing a dust collecting attachment for use in hammering operation according to a second embodiment of the invention.
Figure 8:
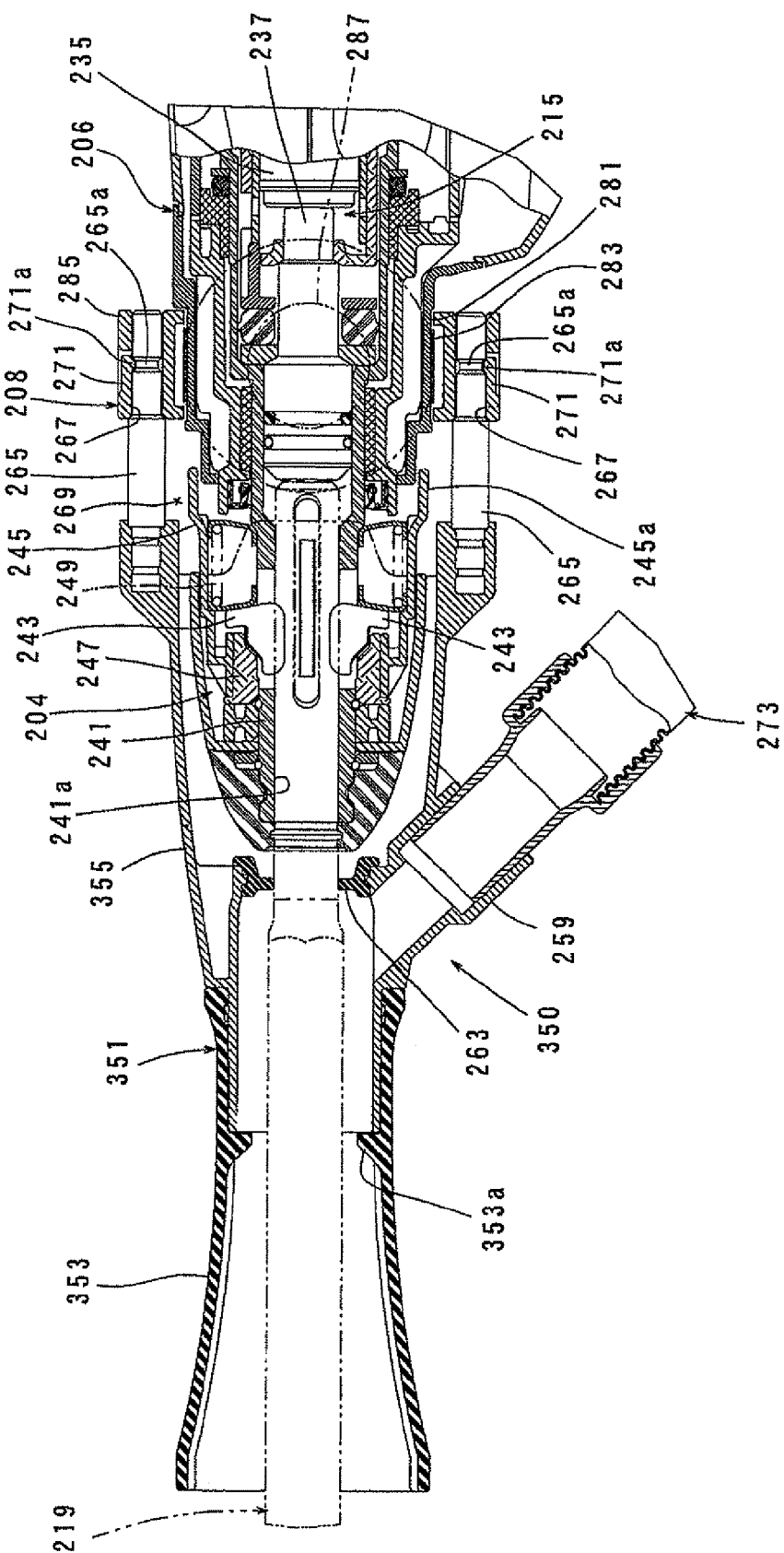
FIG. 8 is an enlarged view showing the dust collecting attachment for use in hammering operation.
Figure 9:
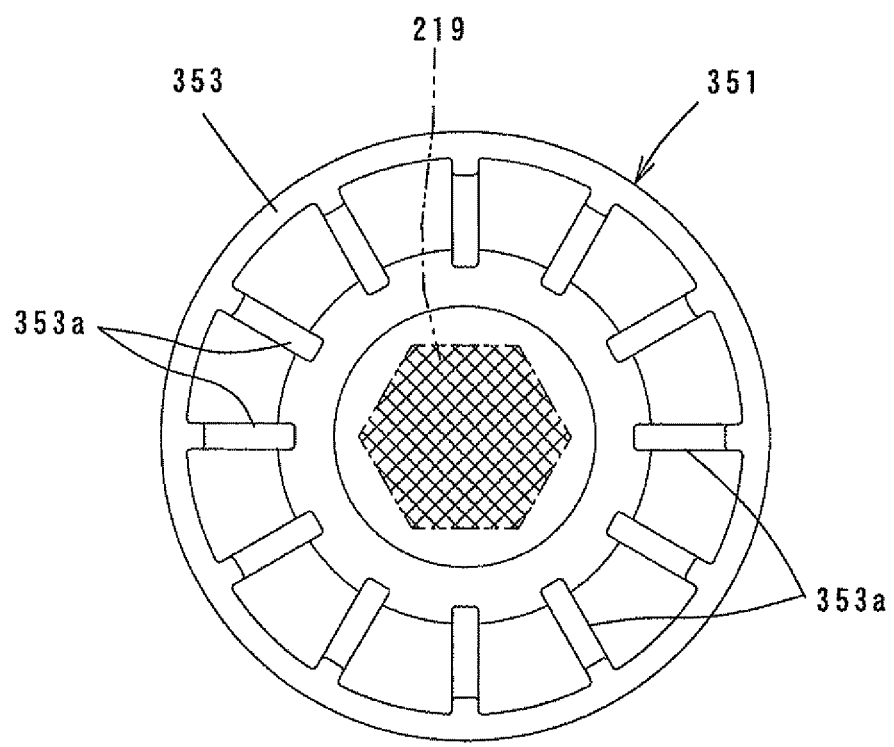
FIG. 9 is a view showing a cup body of a dust collecting cup of the dust collecting attachment for use in hammering operation as viewed from the front of the hammer drill (from the left side as viewed in FIG. 7).

In this embodiment, as shown in FIGS. 7 and 8, the dust collecting attachment 350 for hammering operation is configured such that the tip end of the hammer bit (also referred to as a bull point) 219 for hammering operation protrudes a predetermined distance from the front end of the dust collecting cup 351. Further, a cup body 353 of the dust collecting cup 351 is conically shaped (trumpet-shaped) such that its inside diameter increases toward the front end. Specifically, the opening area of the cup body 353 is maximized at the front end region. With such a configuration, the dust collecting cup 351 can be prevented from interfering with the workpiece and thus with the hammering operation, and at the same time, the ability of collecting dust (ease of catching dust) by the dust collecting cup 351 can be increased. Specifically, the dust collecting attachment 350 of this embodiment is suitably constructed for use in hammering operation in which the hammer bit 219 is caused to perform only the striking movement.

The dust collecting cup 351 includes the cup body 353 and a cup mounting portion 355, and a rear end portion of the cup body 353 is fitted onto a front end portion of the cup mounting portion 355, so that the cup body 353 and the cup mounting portion 355 are connected to each other. The dust collecting cup 351 is a feature that corresponds to the "dust collecting member" according to the invention. A plurality of radially inwardly protruding ribs 353a are formed on the inside surface of the cup body 353 and spaced equidistantly in the circumferential direction. The ribs 353a are located at a predetermined distance toward the back of the cup body 353 (rearward) from the front end of the cup body 353. The ribs 353a serve to define the amount of fit between the cup body 353 and the cup mounting portion 355 by contact with the front end surface of the cup mounting portion 355. Moreover, the ribs 353a serve to prevent large concrete pieces in dust from flowing to the cup mounting portion 355 side by filling the clearance between the inner circumferential surface of the cup body 353 and the outer circumferential surface of the hammer bit 219. In this manner, the ribs 353a effectively work to prevent dust clogging on the downstream side. The rib 353a is a feature that corresponds to the "region for filling the clearance" according to the invention.

Further, constructions other than described above relating to the dust collecting attachment 350 for hammering operation are identical to those in the dust collecting attachment 250 for drilling operation as described in the first embodiment. Therefore, all the components of the dust collecting attachment 350 for hammering operation other than the above-described construction are given like numerals as those of the dust collecting attachment 250 for drilling operation and are only briefly described.

The dust collecting attachment 350 mainly includes the dust collecting cup 351 and the connecting hose 273 which connects the dust collecting cup 351 to a dust collector. The connecting hose 273 is bound to the motor housing 205 and a cord guide (not shown) with banding bands 277, and held by the hose holding rib 279 formed on the motor housing 205. The cup mounting portion 355 has the dust discharge nozzle 259 to which the connecting hose 273 is connected and the sealing member 263 that fills the clearance between the cup mounting portion 355 and the outer circumferential surface of the hammer bit 219. Further, the cup mounting portion 355 is mounted to the side grip 208 via the two poles 265 which are inserted into the engagement holes 267 of the base 285. Further, the engagement protrusion 271a of the engagement member 271 is elastically engaged with the engagement groove 265a of the pole 265, so that the cup mounting portion 355 is retained in the mounting position. In the mounted state of the cup mounting portion 355, the two access spaces 269 for bit removal are defined by the two poles 265 in the circumferential direction between the cup mounting portion 355 and the base 285.

In the dust collecting attachment 350 which is constructed as described above and used in hammering operation, dust generated by hammering operation is collected in the dust collecting cup 351 and then dust collected in the dust collecting cup 351 can be forcibly sucked via the connecting hose 273 by the dust collector. Therefore, a process of disposal of dust accumulated within the dust collecting cup 351, which is required in the construction in which dust is not forcibly collected, can be dispensed with, so that rational dust collection can be realized. Further, it is not necessary to interrupt the operation in order to dispose of the dust collected within the dust collecting cup 351, so that workability can also be improved.

Further, in this embodiment, the ribs 353a formed on the cup body 353 of the dust collecting cup 351 can prevent large concrete pieces from being sucked up to the downstream side and thereby prevent dust clogging.

According to the dust collecting attachment 350 of this embodiment, as for attachment of the dust collecting attachment 350 to the side grip 208 and attachment of the connecting hose 273 to the dust collecting attachment 350, the same effects as the first embodiment can be obtained.

Further, when the dust collecting attachment 250 for use in drilling operation and the dust collecting attachment 350 for use in hammering operation are used on the hammer drill 201, the dust collecting cup 251 or 351 can be attached to the hammer drill 201 by replacing the cup bodies 253, 353 surrounding the hammer bit 219 with each other, according to the operation mode of the hammer bit 219, or according to whether the hammer bit 219 is driven in hammer mode or it is driven in hammer drill mode or drill mode. With such a construction, dust can be collected using the dust collecting cup 251 or 351 designed to be suitable for the particular operation. As a result, dust collection can be efficiently performed, and the connecting hose 273 can be rationally shared. In this case, the dust collecting cups 251, 351 are constructed such that the cup bodies 253, 353 are detachably connected to the cup mounting portions 255, 355. The hammer mode is a feature that corresponds to the "first operation mode" as described in claim 5 according to the invention. The hammer drill mode and the drill mode are features that correspond to the "second operation mode" as defined in claim 5 according to the invention.

Further, the manner of replacing the dust collecting cups 251, 351 is not limited to the manner of replacing only the cup bodies 253, 353, but it also includes the manner of replacing the dust collecting cups 251, 351 in their entirety including the cup mounting portions 255, 355.

Third Embodiment

Figure 10:
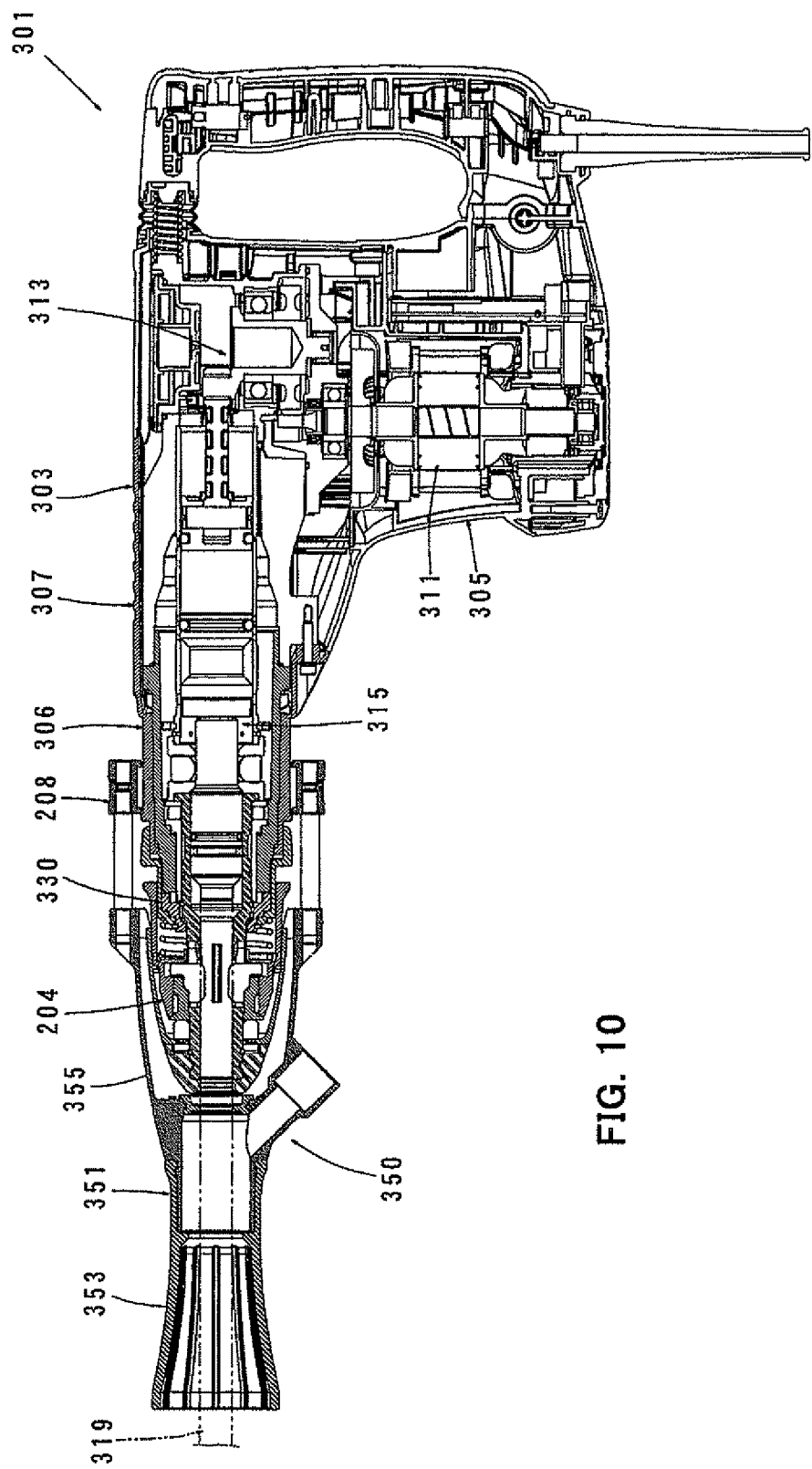
FIG. 10 is a sectional view showing an entire structure of a hammer with a dust collecting attachment attached thereto according to a third embodiment of the invention.

A third embodiment of the invention is now explained with reference to FIGS. 10 and 11. In this embodiment, a dust collecting attachment 350 is used on an electric hammer 301. Like the hammer drill 201 according to the first embodiment, the electric hammer 301 shown in FIG. 10 is of the type in which a driving motor 311 is vertically disposed such that its rotation axis extends in a direction transverse to an axial direction of a hammer bit 319. Further, the electric hammer 301 has a generally L-shaped body structure formed by a motor housing 305 and a gear housing 307. The electric hammer 301 has the same construction as the hammer drill 201 of the first embodiment except that an internal mechanism for driving the hammer bit 319 does not have a mechanism for transmitting rotation. Specifically, the internal mechanism of the electric hammer 301 includes a motion converting mechanism (crank mechanism) 313 that converts the rotating output of the driving motor 311 into linear motion, and a striking mechanism 315 that linearly moves in the longitudinal direction of the body 303 via components of linear motion of the motion converting mechanism 313 and thereby strikes the hammer bit 319. This internal mechanism is known and therefore it is not described in further detail.

Figure 11:
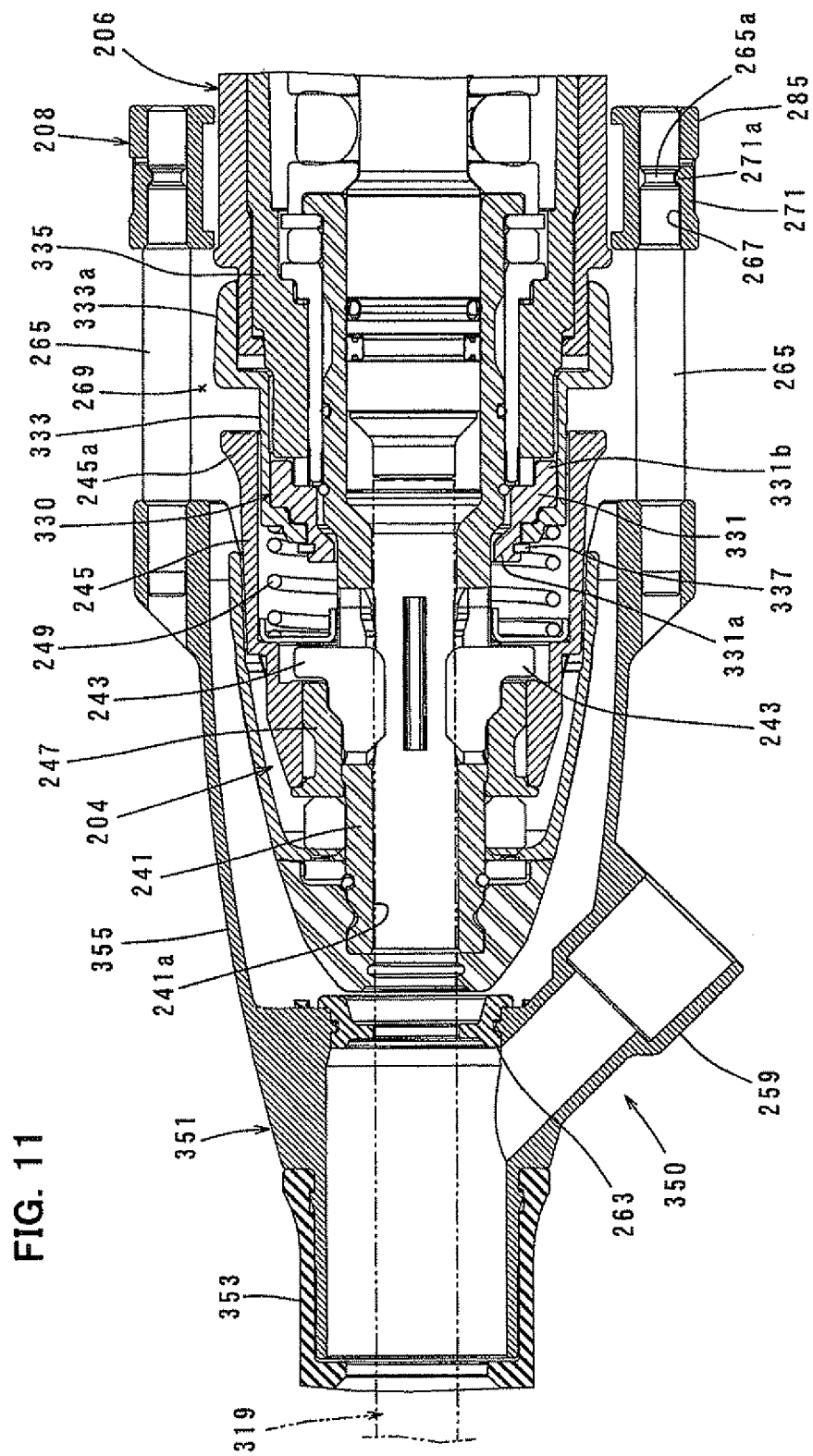
FIG. 11 is an enlarged view showing part (the dust collecting attachment side) of FIG. 10.

As shown in FIG. 11, the electric hammer 301 according to this embodiment has the tool holding device 204 for holding the hammer bit 319 and a bit angle setting mechanism (variolock mechanism) 330 for setting the angle (positioning in the circumferential direction) of the hammer bit 319 held by the tool holding device 204, in the front end region of the body 303. Further, the tool holding device 204 has the same construction as in the above-described first embodiment, and therefore its components are given like numerals and not described.

The bit angle setting mechanism 330 mainly includes a generally annular lock ring 331 which serves to prevent the tool holding device 204 from rotating around its longitudinal direction and a generally cylindrical lock releasing sleeve 333 for bit angle adjustment which serves to release the tool holding device 204 from rotation prevention by the lock ring 331. The lock releasing sleeve 333 is a feature that corresponds to the "operating member for bit angle adjustment" according to the invention. The lock ring 331 is disposed on the middle of the tool holder 241 which is a component of the tool holding device 204, in its longitudinal direction, and can slide in the axial direction of the hammer bit 319. A lock claw 331a is formed on the inner circumferential surface of the lock ring 331 and engaged with a claw formed on the outside of the tool holder 241. Further, a lock claw 331b is formed on the rear end of the lock ring 331 in the longitudinal direction and engaged with a claw formed on the front end of a fixed sleeve 335 in the longitudinal direction. The fixed sleeve 335 is prevented from moving in the circumferential direction with respect to a barrel 306. With such a construction, the tool holding device 204 is prevented from rotating, so that the hammer bit 319 is prevented from unnecessarily rotating in the circumferential direction during hammering operation.

The lock releasing sleeve 333 is disposed at the rear of the bit removing tool sleeve 245 of the tool holding device 204 and on the outside of the lock ring 331 such that it can slide in the longitudinal direction together with the lock ring 331. When the user holds a knob 333a of the lock releasing sleeve 333 and slides it forward, the lock claw of the lock ring 331 can be disengaged from the claw of the lock sleeve 335, so that rotation of the tool holding device 204 is allowed.

The front end portion of the lock releasing sleeve 333 in the longitudinal direction extends into the bit removing tool sleeve 245 in the longitudinal direction. Further, an inward flange of an extending end of the lock releasing sleeve 333 is engaged with the front surface of the lock ring 331 and connected thereto via a retaining ring 337, so that the lock releasing sleeve 333 is integrated with the lock ring 331. The rear end portion of the lock releasing sleeve 333 is fitted onto the periphery of the front end portion of the barrel 306 and this rear end portion is defined as the knob 333a to be operated by the user's fingers. Thus, the knob 245a of the tool sleeve 245 and the knob 333a of the lock releasing sleeve 333 are adjacent to each other with a predetermined spacing in the axial direction of the hammer bit 319. Further, a biasing spring 249 is disposed between the lock releasing sleeve 333 and the bit removing tool sleeve 245 and elastically retains the lock ring 331 in a locked position in which the lock ring 331 is engaged with the claw of the lock sleeve 335 via the lock releasing sleeve 333.

The dust collecting attachment 350 is now explained. The dust collecting attachment 350 according to this embodiment has the same construction as the above-described second embodiment, and therefore its components are given like numerals as in the second embodiment and not described. Further, the connecting hose for connecting the dust collecting cup 351 to a dust collector is not shown. The dust collecting cup 351 is mounted to the side grip 208 via the two poles 265 and in this mounted state, the two access spaces 269 for bit removal are defined by the two poles 265 in the circumferential direction between the cup mounting portion 355 and the side grip 208. The knob 245a of the tool sleeve 245 for bit removal and the knob 333a of the lock releasing sleeve 333 for bit angle adjustment which are described above face the access spaces 269.

Specifically, in this embodiment, in the electric hammer 301 having the tool holding device 204 for holding the hammer bit 319 in the front end region of the body 303 and a bit angle locking mechanism 330 for locking the angle of the hammer bit 319 held by the tool holding device 204, the dust collecting attachment 350 is mounted to the side grip 208 attached to the barrel 306, via the two poles 265. Further, the access spaces 269 are provided in the dust collecting attachment 350 such that the knob 245a of the bit removing tool sleeve 245 in the tool holding device 204 and the knob 333a of the lock releasing sleeve 333 for bit angle adjustment in the bit angle setting mechanism 330 face each other via the access spaces 269. Therefore, according to this embodiment, the user can remove the hammer bit 319 and adjust the angle of the hammer bit 319 with the dust collecting attachment 350 left attached to the side grip 208, so that workability can be improved.

In view of the scope and spirit of the above-described invention, the following aspects can be provided.

(Aspect 1)

"The dust collecting attachment as defined in claim 1, wherein the dust collecting member includes a cup body which can extend and contract in the longitudinal direction, and a cup mounting portion which can be mounted to the auxiliary handle."

(Aspect 2)

"The dust collecting attachment as defined in claim 1, wherein the dust collecting member includes a cup body which is conically shaped such that its inside diameter increases toward the front end, and a cup mounting portion which can be mounted to the auxiliary handle."

(Aspect 3)

A dust collecting attachment used on a power tool that performs a predetermined operation on a workpiece by a tool bit coupled to a front end region of a tool body characterized by:

a dust collecting member for use in a first operation mode in which the tool bit only linearly moves, the dust collecting member including a bit surrounding portion that surrounds the tool bit around a longitudinal axis of the front end region of the tool body, and a front end region surrounding portion that surrounds the front end region of the tool body around the longitudinal axis of the front end region, and a dust collecting member for use in a second operation mode in which the tool bit at least rotates, the dust collecting member including a bit surrounding portion that surrounds the tool bit around the longitudinal axis of the front end region of the tool body, and a front end region surrounding portion that surrounds the front end region of the tool body around the longitudinal axis of the front end region, wherein each of the dust collecting members for use in the first and second operation modes can be disposed in such a manner as to surround the front end region of the power tool around the longitudinal axis in order to collect dust generated by operation of the power tool, and at least the bit surrounding portions of the dust collecting members can be replaced with each other.

(Aspect 4)

The dust collecting attachment as defined in Aspect 3, wherein the dust collecting member for use in the first operation mode is configured such that an opening area of the front end region in the longitudinal direction is larger than a sectional area of the bit surrounding portion, and the first dust collecting member has a region for filling a clearance between an outer circumferential surface of the tool bit and an inner circumferential surface of the dust collecting member in a halfway region in the longitudinal direction.

(Aspect 5)

A power tool having the dust collecting attachment as defined in Aspect 3 or 4.

DESCRIPTION OF NUMERALS 201 hammer drill (power tool)
203 body
204 tool holding device
205 motor housing
206 barrel
207 gear housing
208 side grip (auxiliary handle)
209 handgrip
209a trigger
215 striking mechanism
219 hammer bit (tool bit)
235 striker
237 impact bolt
241 tool holder
241a bit insert hole
243 engagement claw
245 tool sleeve (operating member)
245a knob
247 retaining ring
249 biasing spring
250 dust collecting attachment
251 dust collecting cup (dust collecting member)
253 cup body
255 cup mounting portion
259 dust discharge nozzle
263 sealing member
265 pole
265a engagement groove
267 engagement hole
269 access hole (opening)
271 engagement member
271a engagement protrusion
273 connecting hose
275 cord guard
277 banding band
279 hose holding rib
281 grip mounting portion
283 band
285 base
285a engagement surface
286 nut
287 grip
289 threaded operation rod
301 electric hammer (power tool)
303 body
305 motor housing
306 barrel
307 gear housing
311 driving motor
313 motion converting mechanism
315 striking mechanism
319 hammer bit
330 bit angle setting mechanism
331 lock ring
331a lock claw
331b lock claw
333 lock releasing sleeve (operating member)
333a knob
335 fixed sleeve
337 retaining ring
350 dust collecting attachment
351 dust collecting cup (dust collecting member)
353 cup body
355 cup mounting portion

What we claim is:

1. A dust collecting attachment used on a power tool having a tool body and an auxiliary handle attached to the tool body, wherein a tool bit can be coupled to a front end region of the tool body comprising:
a dust collecting member which can be attached to the auxiliary handle in such a manner as to surround the front end region of the tool body around a longitudinal axis of the front end region in order to collect dust generated during operation by the power tool, and
a connecting hose for connecting the dust collecting member to a dust collector,
wherein the dust collecting member has a protrusion on one end of the dust collecting member in the longitudinal direction, and is attached to the auxiliary handle solely by axial insertion of the protrusion into a mounting hole formed in the auxiliary handle, the insertion of the protrusion into the mounting hole being configured to prevent the dust collecting member from mechanically separating from the auxiliary handle, and
the protrusion inserted into the mounting hole is engaged with an elastic member formed on a wall surface of the mounting hole and thereby retained in an inserted position.

2. The dust collecting attachment as defined in claim 1, wherein two mounting holes and two protrusions are provided in the circumferential direction of the dust collecting member, and each of the protrusions is shaped like a cylindrical pin.

3. The dust collecting attachment as defined in claim 1, wherein the dust collecting member has an opening which is located in a position corresponding to an operating member which is provided for removal of the tool bit and/or for bit angle adjustment in the front end region of the power tool, and the operating member can be operated by user's fingers through the opening.

4. The dust collecting attachment as defined in claim 1, further comprising a fastener that fastens the connecting hose to the tool body.

5. The dust collecting attachment as defined in claim 4, wherein the fastener comprises a band-like member for binding the connecting hose to the tool body.

6. The dust collecting attachment as defined in claim 4, wherein the connecting hose is held by a hose holding portion formed on the tool body, the hose holding portion having a concave surface which conforms to an outer circumferential surface of the connecting hose.

7. The dust collecting attachment as defined in claim 1, wherein the dust collecting member includes a cup body which can extend and contract in the longitudinal direction, and a cup mounting portion which can be mounted to the auxiliary handle.

8. The dust collecting attachment as defined in claim 1, wherein the dust collecting member includes a cup body which is conically shaped such that its inside diameter increases toward the front end, and a cup mounting portion which can be mounted to the auxiliary handle.

9. The dust collecting attachment as defined in claim 1, wherein the protrusion is biased by the elastic member from a direction transverse to the insertion direction of the protrusion to the mounting hole.

10. A power tool having the dust collecting attachment as defined in claim 1.

11. A dust collecting attachment used on a power tool having a tool body and an auxiliary handle attached to the tool body, wherein a tool bit can be coupled to a front end region of the tool body comprising:
   a dust collecting member which can be attached to the auxiliary handle in such a manner as to surround the front end region of the tool body around a longitudinal axis of the front end region in order to collect dust generated during operation by the power tool,
   a connecting hose for connecting the dust collecting member to a dust collector, and
   a fastener that fastens the connecting hose to the tool body, wherein the connecting hose is held by a hose holding portion formed on the tool body, the hose holding portion having a concave surface which conforms to an outer circumferential surface of the connecting hose.

* * * * *